Patented Sept. 2, 1941

2,254,230

UNITED STATES PATENT OFFICE 2,254,230

COMPOUNDS OF THE ANTHRAQUINONE SERIES

Herbert A. Lubs and Oliver H. Johnson, Wilmington, Del., assignors to E. I. du Pont de Nemours & Company, Wilmington, Del., a corporation of Delaware No Drawing. Application September 24, 1940, Serial No. 358,131

5 Claims. (Cl. 260—338)

This invention relates to the preparation of new compounds of the anthraquinone series and more particularly to the preparation of 1-amino-4-arylamino-2-anthraquinone sulfonic acids in which the arylamine group includes a heterocyclic ring containing two oxygens, which compounds dye wool and related fibers in blue shades. The invention also contemplates the preparation of the free bases of these compounds by elimination of the sulfonic acid groups, whereby compounds are obtained which dye cellulose acetate in strong blue shades of good fastness properties.

Many of the dyestuffs of the 1-amino-4-arylamino-2-anthraquinone sulfonic acid series which are obtained from what is generally referred to as "bromamine acid" (1-amino-4-bromo-2-anthraquinone sulfonic acid) show poor leveling properties. To correct the deficiencies in these compounds a number of groups have been introduced in the arylamino radical but the introduction of such groups for the purpose of altering the solubility properties of the dyestuff often causes the resulting dyes to be deficient in fastness properties.

I have found that by introducing an arylamino group which contains attached thereto a heterocyclic ring, containing two oxygen atoms, in the 4-position of bromamine acid, dyestuffs are obtained which show a marked increase in affinity for wool and related fibers over similar types which do not carry such heterocyclic ring and that such dyes are not rendered less fast to oxidizing agents, reducing agents, acidic or alkaline reagents. These products dye wool and related fibers in very bright greenish-blue shades of good general fastness properties. By removing the sulfonic acid group from these compounds by means of the well known alkaline reduction method compounds are obtained which show strong affinity for cellulose acetate silk and which dye that fiber in bright greenish-blue shades of good fastness properties. The heterocyclic aromatic amino compounds which may be introduced may be any of the amino-1,4-benzodioxans, the amino-1,3-benzodioxans or the amino-1,3-benzodioxoles and their simple substitution derivatives.

The following examples are given to illustrate the invention. The parts used are by weight.

Example 1

25 parts of 6-aminobenzodioxan-1,3-hydrochloride, (prepared according to Jour. Chem. Soc. 1933, page 699 followed by reduction with hydrogen in the presence of nickel catalyst) 20 parts of 1-amino-4-bromo-2-anthraquinone sodium sulfonate. 32 parts of sodium bicarbonate and 1 part of copper acetate are heated in 1000 parts of water at reflux for one hour under constant agitation. The mass is then diluted with 1000 parts of water and the solution is filtered hot. Sodium or potassium chloride is added to the filtrate until a concentration of 6% salt solution is reached. The hot solution is then cooled with stirring and the precipitated compound is filtered off, washed twice with a 6% brine solution and then with a small amount of ethyl alcohol and dried. The 1-amino-4-(6'-benzodioxan - 1',3') amino - 2 - anthraquinone alkali metal sulfonate of the formula

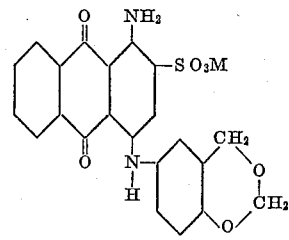

is obtained in the form of lustrous blue crystals containing 5.62% nitrogen and 6.38% sulfur. It dyes wool in very bright shades of blue of good fastness properties.

The sulfonic acid group is conveniently removed by the following process: Nine (9) parts of the above product is dissolved in eight hundred (800) parts of water and ten (10) parts of dextrose is added. This solution is heated to 75° C. and thirty-six (36) parts of a 30% solution of sodium hydroxide is added slowly. The temperature is maintained at 75° C. for thirty minutes and then the suspension is filtered and the precipitate washed with hot water until alkali free and then dried. The product appears as a blue powder containing 7.44% nitrogen with a melting point of 122° C. It dyes cellulose acetate very readily in bright shades of blue having good fastness properties.

Example 2

The condensation of 6-amino-1:4-benzodioxan (prepared according to Compt. Rendu 126 1428 (1898) with the exception that the reduction is accomplished by means of a nickel catalyst and hydrogen under pressure) with 1-amino-4-bromo-2-anthraquinone sodium sulfonate is brought about according to the procedure in Example 1. The 1-amino-4-(6'-benzodioxan-1',4')amino-2-anthraquinone sodium sulfonate of the formula

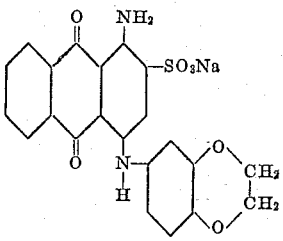

is a crystalline blue compound which dyes wool in bright shades of greenish-blue of good fastness properties.

This compound is conveniently desulfonated by means of the procedure described in Example 1. The compound so produced is a water insoluble dark blue powder containing 7.36% nitrogen with a melting point of 195° C. It dyes cellulose acetate very readily in bright greenish-blue shades of good fastness properties.

Example 3

According to the procedure described in Example 1, 5-amino-benzodioxole (prepared by the process of Jour. Chem. Soc. 95 1979 (1909)) is condensed with 1-amino-4-bromo-2-anthraquinone-2-sodium sulfonate. The dark blue crystalline 1-amino-4-(5'-benzodioxole)amino-2-anthraquinone sodium sulfonate of the formula

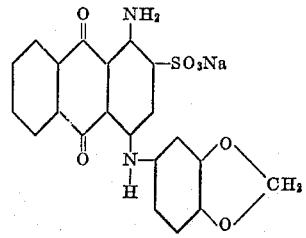

dyes wool in bright greenish-blue shades of good fastness properties.

This compound may be conveniently desulfonated by the process described in Example 1. The water insoluble blue powder so produced dyes cellulose acetate readily in bright greenish-shades of blue of good fastness properties.

We claim:

1. A 1-amino-4-arylaminoanthraquinone which carries in the 2-position a substituent of the group consisting of —H, —SO$_3$H and —SO$_3$M in which M stands for an alkali metal and in which the arylamino group is a heterocyclic radical of the class consisting of aminobenzodioxans and aminobenzodioxoles.

2. A compound of the group consisting of 1-amino-4-arylamino-2-anthraquinone alkali metal sulfonates in which the arylamino group is a heterocyclic radical of the class consisting of aminobenzodioxans and aminobenzodioxoles.

3. 1 - amino-4-(6'-benzodioxan-1',3')amino-2-anthraquinone alkali metal sulfonate.

4. 1 - amino-4-(6'-benzodioxan-1',4')amino-2-anthraquinone alkali metal sulfonate.

5. 1-amino -4-(5'-benzodioxole)amino - 2 - anthraquinone alkali metal sulfonate.

HERBERT A. LUBS.
OLIVER H. JOHNSON.